United States Patent [19]

Hill et al.

[11] 3,982,076

[45] Sept. 21, 1976

[54] NETWORK CONTROL CIRCUIT FOR A TIME DIVISION SWITCHING SYSTEM

[75] Inventors: Donald Gifford Hill; Theras Gordon Lewis, both of Boulder, Colo.

[73] Assignee: Bell Telephone Laboratories, Incorporated, Murray Hill, N. J. 07974

[22] Filed: Dec. 23, 1974

[21] Appl. No.: 535,576

[52] U.S. Cl. .......................................... 179/15 AT
[51] Int. Cl.[2] .......................................... H04J 3/02
[58] Field of Search .......... 179/15 AT, 15 AL, 18 J

[56] References Cited
UNITED STATES PATENTS

| | | | |
|---|---|---|---|
| 3,428,754 | 2/1969 | Hoyler et al. | 179/15 AT |
| 3,681,759 | 8/1972 | Hill | 179/15 AL |
| 3,789,152 | 1/1974 | Medill et al. | 179/18 J |
| 3,881,156 | 4/1975 | Deutsch | 179/15 AL |

Primary Examiner—Douglas W. Olms
Attorney, Agent, or Firm—F. W. Padden

[57] ABSTRACT

A network control circuit which allows time division switching systems of different sizes to operate with the same port circuit is disclosed. The time division switching systems utilize a port circuit with a ring counter which controls connection of the circuit to a system bus for establishing telecommunications paths. Each port circuit is provided with a ring counter which has one stage per time slot for the largest size switching system. A network control circuit generates commands which control circuitry associated with the ring counter to write bits into stages of the ring counter causing connection during appropriate time slots. When the port circuit is used with the largest sized switching system, one bit is written into the counter causing one connection per system cycle. In order to use the port circuit with switching systems that have fewer time slots, the network control generates commands to write two or more bits into the ring counter causing the ring counter to appear as if it had fewer stages.

11 Claims, 2 Drawing Figures

NETWORK CONTROL CIRCUIT FOR A TIME DIVISION SWITCHING SYSTEM

BACKGROUND OF THE INVENTION

This invention relates to telecommunications switching systems and in particular to time division switching systems.

Time division telecommunications switching systems commonly utilize port circuits (such as line and trunk circuits) which contain a recirculating ring counter driven by the system clock. In order to connect the port circuit to a common bus to permit communications interchange, a one-bit is written into a stage of the ring counter. The one-bit circulates through the ring counter under control of the system clock and upon reaching a predetermined location, it enables time division switches which connect the port circuit to the common bus. If the ring counter is provided with one stage for each time slot in the system, the one-bit will appear at the predetermined location each time the system cycles through all of the time slots. The port circuit is designated as being assigned the time slot which corresponds to the ring counter stage in which the one-bit is written.

Since there is a one-to-one correspondence between the number of time slots and the number of stages in the port circuit ring counters, the prior art has required different port circuits for different numbers of time slots. Accordingly, a problem in the prior art has been that expensive and coupled physical equipment changes have been required for increasing or decreasing line and trunk ports in a switching system. Such changes frequently are demanded by customers to fulfill dynamic service needs. Unfortunately, they tend to increase outage time of the system and contribute to higher cost service and inventory.

It is apparent that there is a need for a system which can operate with various numbers of time slots while utilizing the same port circuit and ring counter circuitry.

Accordingly, it is an object of the present invention to allow various size switching systems to utilize the same port circuit.

It is a further object of the present invention to minimize the number of modifications necessary to change the size of a switching system.

SUMMARY OF THE INVENTION

The foregoing and other objects are achieved in accordance with the principles of the present invention in one illustrative embodiment thereof wherein a network controller causes one or more one-bits to be written into the port circuit ring counter making the counter appear as if it had different numbers of stages.

Specifically, the network controller is provided with a time slot counter and a cycle counter. The time slot counter repeatedly counts through the number of time slots provided in the system. Each time a complete cycle of time slots has been counted, the cycle counter advances once and commands are generated which control the port circuitry to write a one-bit into the port circuit ring counter. For a large system, the number of stages in the time slot counter and the number of stages in the port circuit ring counter are equal and the cycle counter in the system is set to count one bit. Thus, after the time slot counter has gone through one complete cycle, the cycle counter will be advanced once and a one-bit will be written into the port circuit ring counter to complete the operation. Each time the switching system is cycled through all of the time slots, the port circuit will be connected to the system bus once.

If the port circuit is operating with a smaller size switching system with, for example, half the number of time slots as the larger system, a time slot counter with half the number of stages as the counter in the large system and a cycle counter with two bits are provided. Therefore, the time slot counter will sequence twice and two one-bits will be written into the ring counter of the port circuit before the write operation is completed. Each time the switching system is cycled through all of the time slots, the port circuit will be connected to the system bus twice, effectively making the ring counter in the port circuit appear as if it were a ring counter with half the number of stages and only one one-bit written into it. In order to keep the system operating at the same speed, the system clock rate is reduced to one-half the rate used for the larger system.

The only modifications which are necessary to allow the system to operate with different numbers of time slots occur in the network control and the system clock rather than in the port circuits. Since there is only one network control circuit, and one system clock, the cost of modifying the system is greatly reduced compared to the cost of modifying all of the port circuits.

DETAILED DESCRIPTION

Figure 1:
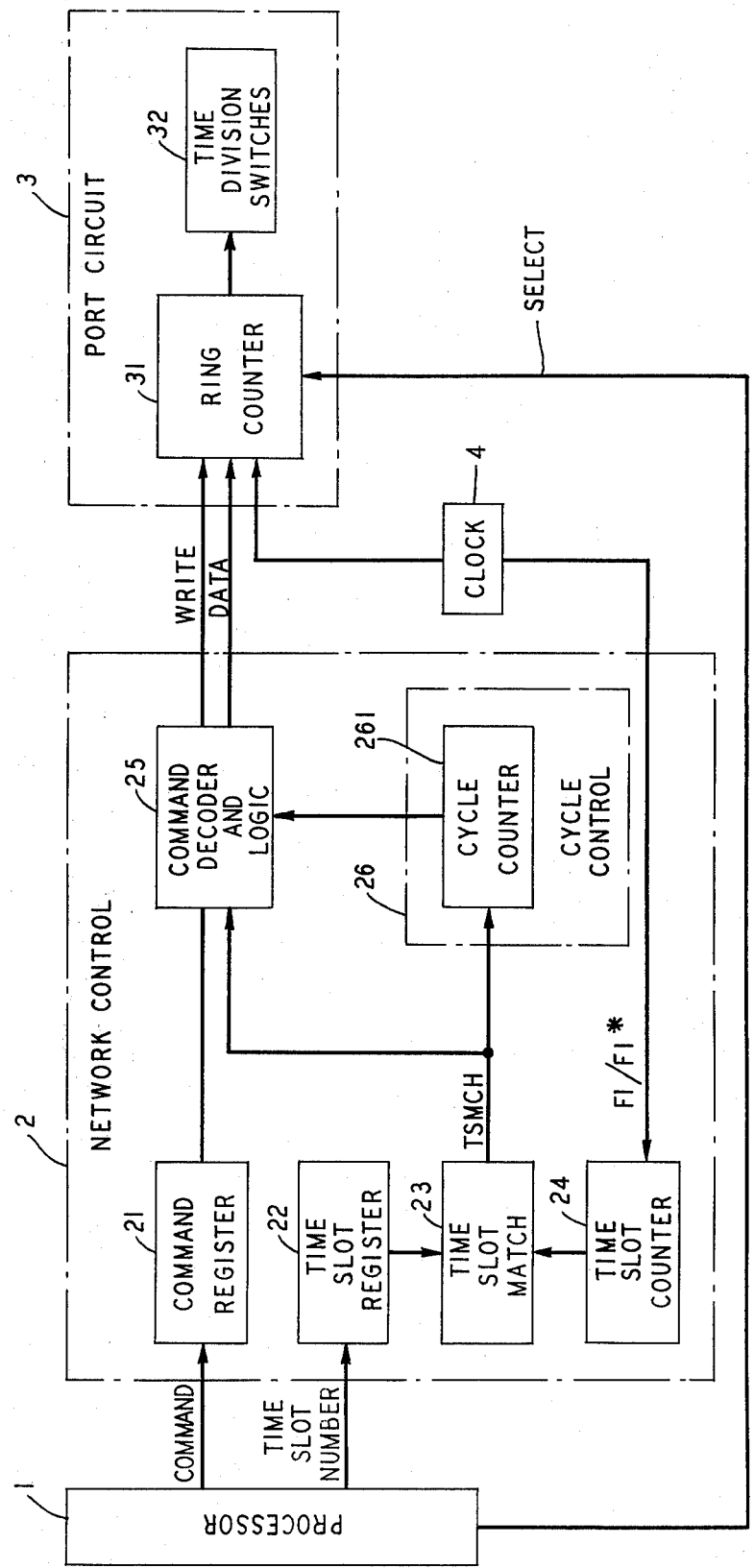
FIG. 1 of the drawing is a block diagram of an illustrative time division switching system utilizing the present invention.

FIG. 1 of the drawing shows a time division switching system consisting basically of processor 1, network control 2, and a plurality of port circuits of which only port circuit 3 is shown. Processor 1 contains scanner circuits, logic circuits, and memory circuits which receive information regarding call progress and other information from port circuits, such as port circuit 3, and operate to determine which port circuits shall be connected together to form a communications connection. The operations of processor 1, which are not necessary for an understanding of our invention are not discussed in detail herein. A more complete description of a processor such as processor 1 is given in U.S. patent application, Ser. No. 533,339, filed on Dec. 13, 1974, by John C. Moran and assigned to the same assignee as the present invention. Processor 1 also contains scanner and distributor circuits which control port circuit 3 directly by means of select leads and indirectly by means of network control 2. Processor 1, network control 2, and port circuits, such as port circuit 3, are synchronized by system clock 4 which produces various timing and sequencing pulses.

Port circuit 3 contains ring counter 31 which is a recirculating counter that continuously sequences under control of clock 4. Port circuit 3 may be connected to a system bus (not shown) by time division switches 32 to establish a telecommunications path. Time division switches 32 are in turn under control of ring counter 31. One-bits written into one or more stages in ring counter 31 control time division switches 32 when the bits reach a predetermined stage in counter 31. Thus, if a single one-bit is written in counter 31, time division switches 32 will be enabled during one time slot each time counter 31 sequences through a complete cycle under control of clock 4. If two one-bits are written into ring counter 31, time division switches 32 will be activated twice during each cycle of counter 31. The operation and control of ring counter 31 and time division switches 32 in port circuit 3 are well known to those skilled in the art. An example of port circuitry which may be readily modified for use with our invention is described in U.S. Pat. No. 3,789,152, issued to D. G. Medill et al. on Jan. 29, 1974. Further illustrative ring counter or recirculating shift register circuits which may be readily adapted for use with our invention are disclosed in U.S. Pat. No. 3,796,833, issued to T. G. Lewis et al. on Mar. 12, 1974; U.S. Pat. No. 3,804,989, issued to R. L. Carbrey on Apr. 16, 1974; and the Texas Instruments *Integrated Circuits Catalog for Design Engineers*, First Edition, 1971, pp. 14–71 to 14–76. These operations are not necessary for an understanding of our invention and will not be discussed further.

In order to prepare port circuit 3 for a write operation, processor 1 selects an individual circuit such as circuit 3 by means of select leads, shown in FIG. 1. One-bits are actually written and cleared from ring counter 31 under control of network control 2 by means of the write and data leads. Network control 2 in turn receives write and clear commands and time slot numbers from processor 1 by means of the command and time slot number leads. The write and clear command and the time slot number are stored in command register 21 and the time slot register 22, respectively. Time slot match 23 receives the stored time slot number from time slot register 22 and the output of time slot counter 24, which is continuously running under control of clock pulses F1 and F1 provided by system clock 4. When the number produced by time slot counter 24 equals the number stored in time slot register 22, time slot match 23 enables command decoder 25 via lead TSMCH. Command decoder 25 also receives the command stored in command register 21. Based on the command information, command decoder 25 produces a write command on the write lead which writes a bit in the corresponding stage of ring counter 31 in port circuit 3. The value of the bit (zero or one) which is to be inserted in ring counter 31 is specified by command decoder 25 via the data lead. In addition, time slot match circuit 23 advances cycle counter 261 in cycle control 26 once each time the number produced by counter 24 equals the number stored in time slot register 22. Thus, cycle counter 261 is counted once each time a bit is written into ring counter 31 in port circuit 3. After a predetermined number of bits have been written into ring counter 31 in port circuit 3 and counter 261 has been advanced an equal number of counts, counter 261 and cycle control 26 disable command decoder 25 to complete the write operation.

Assume, for example, it is desired to use port circuit 3 with time division switching circuits having either 64 time slots or 128 time slots. Port circuit 3 would be provided with ring counter 31 containing 128 stages corresponding to the largest number of time slots with which port circuit 3 is to operate. In order to operate the system as a 128 time slot system, time slot register 22, time slot match 23, and time slot counter 24 would be equipped with seven bits in order to handle 128 different time slots. In addition, cycle counter 261 is equipped to count one-bit. During a write operation, time slot counter 24 will cycle once through 128 counts. When the number produced by counter 24 matches the number stored in register 22 as previously discussed, command decoder 25 under control of time slot match 23 will write a one-bit into ring counter 31 in port circuit 3 in the proper stage. In addition, cycle counter 261 will be counted once, completing the write operation. Thus, a single bit will be written into ring counter 31. This single bit will operate time division switches 32 once for each cycle of the machine. Assume now that port circuit 3 is to operate with a system having only 64 time slots. In this case, time slot register 22, time slot match 23 and time slot counter 24 need only have six bits to handle 64 time slots. Cycle counter 261, however, is equipped to count two bits. Operation continues as previously discussed. When a match is recognized by match circuit 23, a one-bit is written into time slot register 31 and cycle counter 261 is counted once. However, since counter 261 is a two-bit counter, the operation is repeated and a second one-bit is written into ring counter 31 at a position 64 bits away from the first one-bit in register 31. Cycle counter 261 is again counted and the operation is completed. Since there are only 64 time slots in the system and ring counter 31 contains 128 stages, ring counter 31 will only cycle once each time time slot counter 24 and the switching system goes through two cycles. However, since two one-bits have been written into ring counter 31, 64 bits apart, time division switch 32 will still be activated once for each cycle of the system. In order to keep the system operating at the same speed as the larger 128 time slot system, system clock 4 is slowed down to one-half the rate of the 128 time slot system.

Figure 2:
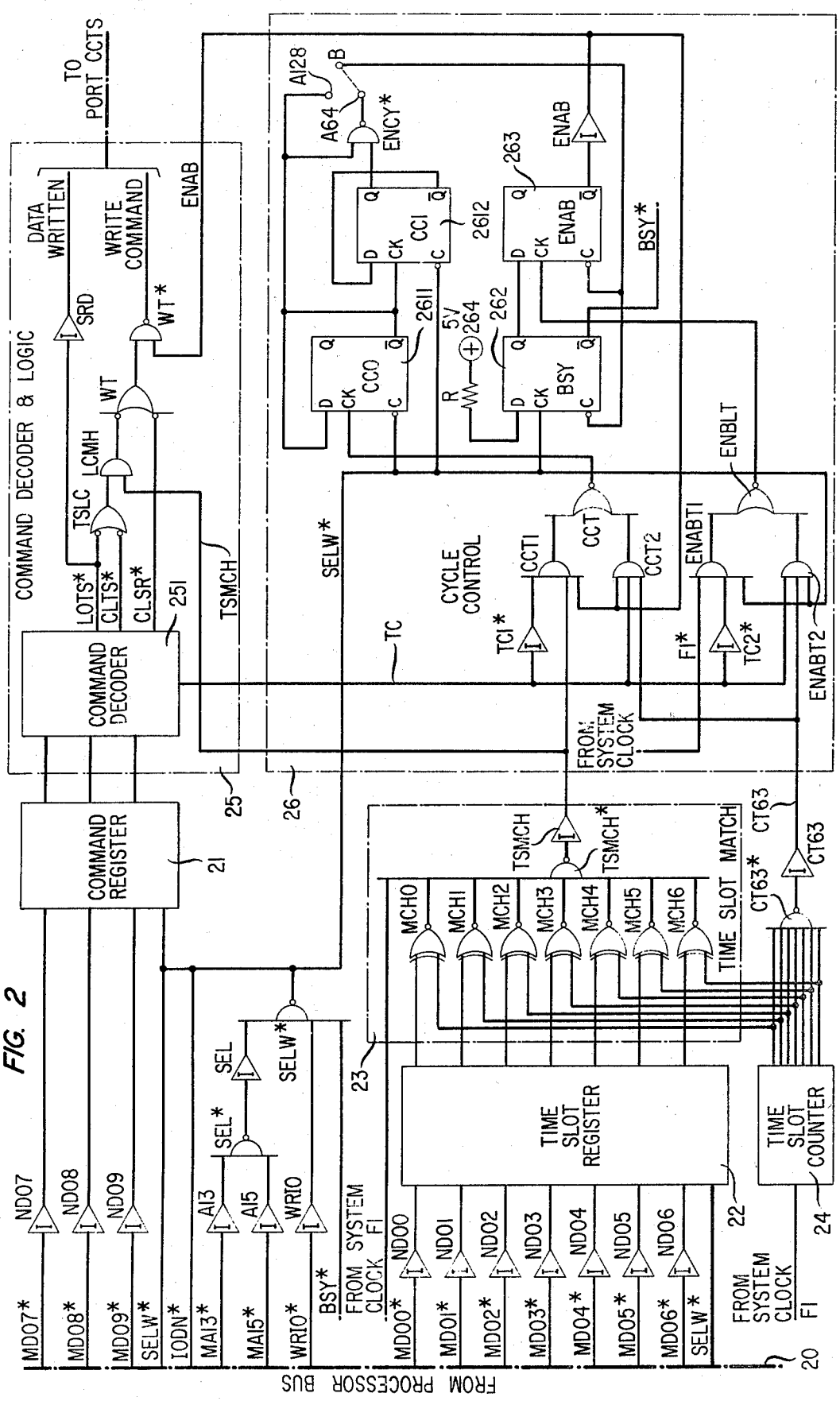
FIG. 2 is a detailed schematic diagram of the network control shown in FIG. 1.

A detailed operation of network control 2 may be followed by referring to FIG. 2 which is a schematic diagram of the network controller. As shown in FIG. the controller consists of a command register 21, time slot register 22, time slot match circuit 23, time slot counter 24, command decoder and associated logic 25 and cycle control 26. The illustrative embodiment disclosed is arranged to operate with systems having either 64 or 128 time slots. Therefore, time slot register 22, time slot match circuit 23 and time slot counter 24 are equipped to operate on seven bits in order to accommodate 128 numbers. For circuits which only have 64 time slots, the last bit, of course, is not used and may be entirely eliminated.

Network control 2 communicates with processor 1 (FIG. 1) by means of processor bus 20 (FIG. 2) which contains a plurality of leads. In order to seize network controller 2 in preparation for a write operation, processor 1 applies low signals to address leads MA13 and MA15 by means of processor bus 20. In addition, a low signal is applied to lead WRIO* to indicate that this is to be a write operation. FIG. 2 uses the convention that leads which are high during an idle condition are marked by asterisks such as lead MA13 . These leads have a low signal impressed on them when active. Leads which are not marked with an asterisk (such as lead F1) are low when idle and high when active. At this time, processor 1 also provides command information and time slot number information on leads MD00 through MD09 . This information is clocked into command register 21 and time slot register 22 after network control 2 has been seized as hereinafter described. The low signals on leads MA13 , MA15 and WRIO* are inverted by inverters A13, A15, and WRIO, respectively. The high signals produced by inverters A13 and A15 are applied to the two inputs of NAND gate, SEL*, which thereupon produces a low output. The low output is in turn inverted by inverter SEL and applied to the upper input of NAND gate SELW*. The center input of NAND gate SELW* simultaneously receives a high signal from the output of inverter WRIO and a high input on lead BSY* from busy flip-flop 262 in cycle control 26. NAND gate SELW* therefore produces a low output on lead SELW* which informs network control 2 that it has been selected and that a write operation is desired. In particular, the low signal on lead SELW* is applied to command register 21 and time slot register 22 via bus 20 to clock data in on leads MD00 through MD09 . The low signal on lead SELW* is also applied to the clear input of cycle counter flip-flops 2611 and 2612 to set them to zero. Flip-flops such as the cycle counter flip-flops 2611 and 2612, busy flip-flop 262, and enable flip-flop 263 are well known D-type flip-flops which have three inputs: the D input, the clock input (CK), and the clear input (C). A signal applied to the D input will appear at the Q output on the rising edge of a clock pulse applied to the CK input. A low signal applied to the clear or C input causes the Q output to be set to logical zero regardless of the state of the clock input. Therefore, the low input applied by lead SELW* to the clear inputs of flip-flops 2611 and 2612 sets outputs Q of both flip-flops to logical zero. The low signal on lead SELW* is also applied to the clock input of busy flip-flop 262. However, since flip-flop 262 changes state only on the rising edge of a signal applied to its clock input, flip-flop 262 does not change state at this time. The low signal on SELW* is additionally applied to AND gates ENABT1 and ENABT2 to disable gates ENABT1 and ENABT2 preventing enable flip-flop 263 from being operated at this time. Flip-flop 263 determines the beginning and the end of a write operation as will be hereinafter described in detail. Finally, a low signal is returned from gate SELW* to the processor by means of lead IODN* which low signal informs the processor that network control 2 has been seized and is ready to receive commands.

The processor responds to a low signal on lead IODN* by removing the low signals from leads MA13 , MA15 and WRIO* in turn disabling gates SEL* and SELW* causing the low signal on lead SELW* to be changed to a high signal. A change from a low to high signal on lead SELW* clocks busy flip-flop 262 in cycle control 26. Since busy flip-flop 262 has its D input connected to logical one via resistor R and potential source 264, a high signal appears at the Q output of flip-flop 262 and a low signal appears at the Q output and lead BSY*. The operation of flip-flop 262 indicates that network control 2 has been seized and is busy. Accordingly, the low signal appearing on lead BSY* is applied to NAND gate SELW*, disabling it and preventing the processor from inadvertently reseizing network control 2 in the course of a write operation.

Network control 2 has been informed of the desired operation (via bus 20) by data on command leads MD07 , MD08 and MD09 . Commands provided by the processor (which are combination of low signals on leads MD07 through MD09 ) are inverted by inverters ND07 through ND09 and stored in command register 21 (this data was clocked into command register 21 when lead SELW* went low, as previously described). The three basic commands which are processed by network controller 2 are the clear time slot command (which causes a zero to be written into a designated time slot), the load time slot command (which causes a one to be written into a designated state of the port circuit ring counter) and the clear shift register command (which causes all stages of the port circuit ring counter to be written with zeros). The commands stored in command register 21 are applied to command decoder 251 which produces a low signal on one of its three outputs corresponding to the received command.

Assume, for example, that the load time slot command is received by command register 21 and decoded in command decoder 251. Command decoder 251 places a low signal on its output lead LOTS* which is inverted by inverter SRD and applied as a high signal to the data written lead. The data written lead is multipled to all port circuits, and the high signal thereon informs the selected port circuit that a logical one is to be written into a time slot. However, the logical one is not actually written into the port circuit ring counter until a low signal appears on the write command lead which is also multipled to all port circuits. The write command lead is operated by time slot match 23 when the proper time slot arrives. In particular, the low signal on lead LOTS* is also applied to gate TSLC to cause that gate to apply a high output to the input of gate LCMH. Enabled gate LCMH is controlled by a high signal on lead TSMCH which is generated at the appropriate time by slot match 23 so that data is written into the proper stage of the port circuit ring counter.

Lead TSMCH is controlled by time slot match circuit 23 which is in turn controlled by time slot register 22 and time slot counter 24.

Time slot register 22 receives the number of the time slot into which data is to be written via bus 20 and leads MD00 through MD05 . As discussed previously, for a 64 time slot system, lead MD06 and inverter ND06 are not used. The time slot number recorded by the code on leads MD00 through MD05 is inverted by inverters ND00 through ND05 and stored in time slot register 22 during the seizure of network control 2 as previously described. The time slot number code thereupon appears at the outputs of time slot register 22 and is applied to exclusive NOR gates MCH0 through MCH5 in time slot match 23. (Exclusive NOR gate MCH6 is not used for 64 time slot system). The other input of gates MCH0 through MCH5 is provided by the outputs of time slot counter 24. For a 64 time slot system, time slot counter 24 sequentially produces codes on its outputs corresponding to the numbers zero through 63 under control of system clock 4 (FIG. 1) via lead F1. Time slot counter 24 cycles continuously, that is, when the count equal to the number 63 is reached, the counter is reset to zero and continues counting. When the code provided by time slot counter 24 on its outputs equals the code on the outputs of time slot register 22, exclusive NOR gates MCH0 through MCH5 all produce high signals at their outputs, which signals turn on NAND gate TSMCH*. Turned on gate TSMCH* produces a low signal at its output which is inverted by inverter TSMCH and applied as a high signal to lead TSMCH. As discussed previously, the high signal on lead TSMCH operates gate LCMH which provides a high signal to OR gate WT. Gate WT forwards the high signal to NAND gate WT*. NAND gate WT* also receives a high signal at its other input from lead ENAB at this time, which high signal on lead ENAB is produced by flip-flop ENAB as will be hereinafter discussed. Since NAND gate WT* has high signals at both its inputs, it produces a low signal on the write command lead. When the selected port circuit receives a write command, it writes a one-bit into a predetermined stage of its ring counter. Since the ring counter in the port circuit is driven by system clock 4, it cycles in synchronism with time slot counter 24. Thus, the proper stage of the ring counter in the selected port circuit will be written, since the write command is given only when a match is detected.

As previously described, NAND gate WT* is controlled by lead ENAB which is in turn controlled by enable flip-flop 263 and inverter ENAB. Enable flip-flop 263 determines the beginning and the end of the write operation cycle. A write operation cycle is commenced when flip-flop 263 receives a high signal at its D input from the output Q of busy flip-flop 262 (which was set when network control 2 was selected by the processor as previously discussed). The clock input of enable flip-flop 263 is controlled by gates ENABT1, ENABT2 and ENBLT. These gates function to ensure that the write command will always be present at the port register for the entire duration of the desired time slot. This operation is accomplished by ensuring that flip-flop ENAB is set at the beginning of a time slot or on the rising edge of a clock pulse. In particular, gate ENABT1 receives inverted clock pulses at its upper input from lead F1 . According to the convention in FIG. 2 lead F1 is high during idle and low during a time slot. Therefore, at the beginning of a time slot, a high-to-low transition occurs on lead F1 . This high-to-low transition is forwarded by AND gate ENABT1 to NOR gate ENBLT and appears as a low-to-high transition at the clock input of flip-flop 263. The low-to-high transition sets flip-flop 263, causing a low signal to appear at the $\bar{Q}$ output, which signal is inverted by inverter ENAB to appear as a high signal on lead ENAB. The high signal enables NAND gate WT* to produce a write command as previously discussed. Since enable flip-flop 263 may only be set at the beginning of a time slot, gate WT*, as controlled by lead ENAB, prevents a write command from being given during the middle of a time slot which would result in improper operation of the port circuit control logic.

The high signal on lead ENAB is also forwarded to AND gates CCT1 and CCT2. Gates CCT1, CCT2 and NOR gate CCT control the cycle counter consisting of flip-flops 2611 and 2612. The cycle counter is counted each time the outputs of time slot counter 24 match the outputs of time slot register 22, and the cycle counter controls enable flip-flop 263 to determine when the end of the write operation is reached. In particular, a high output of time slot match 23, which occurs when time slot match detects a match condition is applied to gate CCT1, via lead TSMCH which gate is turned on to produce a high signal at its output. The high signal at the output of gate CCT1 is applied to NOR gate CCT, and NOR gate CCT thereupon applies a low signal to the clock input of counter flip-flop 2611. After the data has been written into the appropriate time slot as discussed above, time slot counter 24 advances to the next time slot number, causing the output of time slot match 23 to return to zero. Thus, a high-to-low transition is forwarded through AND Gate CT1, is inverted by NOR gate CCT and applied as a low-to-high transition to the clock input of counter flip-flop 2611. This low-to-high transition clocks flip-flop 2611 and causes a signal appearing at the D input of flip-flop 2611 to appear at the Q input. As shown, the D input of flip-flop 2611 is connected at the $\bar{Q}$ output of flip-flop 2611. Thus, with each clock pulse, an inverted output appears at the D input. This causes flip-flop 2611 to change state or toggle each time a clock pulse is applied to its clock input. Therefore, when a clock pulse is received from time slot match circuit 23 via gates CCT1 and CCT, the Q output of flip-flop 2611 becomes high and the $\bar{Q}$ output becomes low.

The write operation continues as time slot counter 24 advances under control of the system clock via lead F1. After a full cycle, the outputs of time slot counter 24 again match the outputs of time slot register 22. As previously described, lead TSMCH receives a high signal thereon from the output of time slot match 23, which high signal causes a second one-bit to be written into the ring counter in the selected port circuit. In addition, the high signal on lead TSMCH is forwarded through gates CCT1 and CCT to the clock input of flip-flop 2611. At the end of the time slot, flip-flop 2611 again reverses its state or toggles. The $\bar{Q}$ output now becomes high and the high output becomes low. The low-to-high transition at the $\bar{Q}$ output of flip-flop 2611 is applied to the clock input of counter flip-flop 2612. Flip-flop 2612 is connected in a similar configuration as flip-flop 2611 so that the clock pulse produced by flip-flop 2611 also causes it to toggle and a high output appears at its Q output. The high output at the $\bar{Q}$ output of flip-flop 2611 and the high signal at the Q output of flip-flop 2612 are applied to NAND gate ENCY*, causing it to produce a low signal at its output. The output of gate ENCY* is connected to terminal A64. In the illustrative network control shown in FIG. 2, provision has been made for operating the circuit when either 128 or 64 time slots, as previously described. In order to operate the control with 64 time slots, terminal 64 is strapped to terminal B as shown in FIG. 2. For operation with 128 time slots, terminal A128 would be strapped to terminal B as will be hereinafter described.

Therefore, the low signal appearing at terminal A64 is forwarded via terminal B to the clear inputs of busy flip-flop 262 and enable flip-flop 263, which low signal resets both flip-flops. The resetting of busy flip-flop 262 indicates that network control 2 has completed the write operation. Reset flip-flop 263 produces a high signal at its $\bar{Q}$ output, which high signal is inverted by gate inverter ENAB and applied as a low signal to lead ENAB, which low signal disables gate WT* and prevents any further write commands from being generated by network control 2. Thus, at the end of the load time slot operation, two one-bits have been written into the selected port circuit ring counter.

The processor may also instruct network control 2 to clear a given time slot. In this case, commands received by command register 21 and command decoder 251 cause lead CLTS* to become low. This low signal is forwarded by gate TSLC to gate LCMB. Operation proceeds in an analogous manner to the load time slot operation except that the data written lead is provided with a low signal from the output of inverter SRD instead of a high signal as with the aforementioned load operation. Thus zeros are written into the appropriate time slots in the selected port circuit ring counter. In this manner a particular time slot may be cleared or written to zero.

The third command which may be generated by the processor is the clear shift register command. This command causes all of the stages in the selected port circuit ring counter to be written to zero. When this command is received by command register 21 and command decoder 251, lead CLSR* becomes low. Since this command does not depend on a time slot number, the time slot match circuitry is not necessary to complete the operation and the low signal on lead CLSR* is applied directly to OR gate WT, which forwards the low signal as a high signal to NAND gate WT*. The operation of gate WT* is controlled by enable flip-flop 263 which is now set at the beginning of a cycle rather than at the beginning of a time slot as in previous commands. In particular, the outputs of time slot counter 24 are inputted to NAND gate CT63 . When time slot counter 24 reaches the count corresponding to the number 63, all of its outputs will have a high signal thereon. At this time gate CT63 will be enabled, producing a low signal at its output, which low signal is inverted by inverter CT63 to appear as a high signal on lead CT63. Thus, a high signal will appear on lead CT63 once during each cycle of time slot counter 24. This high signal is applied to AND gates CCT2 and ENABT2. In addition, command decoder 251 produces a high signal on lead TC when it decodes a command which requires operation over a total cycle. This high signal is applied to gate CCT2 and ENABT2 to turn both gates on. The high signal on lead TC is applied as a low signal to gates CCT1 and ENABT1 by inverters TC1 and TC2 to disable gates CCT1 and ENABT1 to prevent improper operation. Operated gate ENABT2 forwards a high signal to NOR gate ENBLT, which applies a low signal to the clock input of enable flip-flop 263. On the next clock pulse, gate CT63 is disabled causing a low-to-high transition to be forwarded to flip-flop 263, which transition sets flip-flop 263 to produce a low signal at its Q̄ output. The low signal at the Q̄ output is inverted by inverter ENAB and appears as a high signal on lead ENAB to operate gate WT*. Thus, a write command is generated by network control 2 at the beginning of a cycle. In addition, counter flip-flop 2611 is advanced by means of gates CCT2 and CCT. The high to low transition occurring on lead CT63 is forwarded by gates CCT2 and CCT to appear as a low-to-high transition at flip-flop 2611, which toggles flip-flop 2611 as previously described. Thus, each time time slot counter 24 completes a full cycle of codes, the cycle counter consisting of flip-flops 2611 and 2612 is advanced once. After two cycles, as previously described, gate ENCY* will be enabled to reset busy flip-flop 262 and enable flip-flop 263, completing the clear operation. Thus, all bits in the selected port circuit ring counter will be written to zero for two cycles of time slot counter 24. However, since the port circuit ring counters have 128 stages, whereas time slot counter 24 completes a cycle after 64 counts, the entire ring counter 31 will be cleared during a clear operation.

The previous discussion concerned operation of the network control in a system which had 64 time slots. It is also possible, in accordance with the principles of our invention, to utilize the same network control in the same port circuits for operation with switching systems utilizing 128 time slots. In order to do this, all stages in time slot register 22 and time slot counter 24 are utilized. In addition, the strap from terminal A64 to terminal B in cycle control 26 is removed and terminal A128 is instead connected to terminal B. This circuit change effectively removes flip-flop 2612 and gate ENCY* from the circuit. The cycle counter, therefore, consists solely of flip-flop 2611 or is, in effect, a one-bit counter. For the load time slot and clear time slot commands, the operation of the circuit is the same as described above for 64 time slot operation. That is, each time a match is detected by time slot match 23, a one-bit is written into the selected port circuit ring counter and the cycle counter is advanced once. However, since the cycle counter consists solely of flip-flop 2611, a clock pulse appearing at the clock input of flip-flop 2611 causes the flip-flop to toggle as previously described and a low signal to appear at the Q̄ output. This low signal is forwarded via terminal A128, and terminal B to the clear inputs of busy flip-flop 262 and enable flip-flop 263, resetting both flip-flops and ending the cycle. Thus, only a single bit is written into the selected port circuit shift register rather than two bits as discussed above. Similarly, the clear shift register operation is carried on for only a single cycle. However, since time slot counter 24 now has 7 bits, it completes a cycle after 128 counts so that the entire 128 bit port circuit ring counter is cleared during the operation.

The illustrative embodiment discussed above shows a network control which operates with time division systems having either 64 or 128 time slots. However, it is clear that the illustrative circuit may be modified in order to operate with various numbers of time slots without departing from the spirit and scope of our invention. For example, in order to operate with 32 time slots, it would only be necessary to modify time slot counter 24 so that it would complete a cycle after 32 counts. In addition, the cycle counter would be modified to count four cycles of the time slot counter in order that four one-bits would be inserted in the port circuit ring counters during each write operation. Similarly, the circuit may be modified for other numbers of time slots. In each case, time slot register 22 and time slot counter 24 are modified in order to provide a number of stages equal to the number of time slots. Cycle counter 261 is modified in order to count a number of times equal to the number of ring counter stages divided by the total number of time slots. The system clock, of course, must be modified in order to change its rate to keep the system operating to the proper speed.

What is claimed is:

1. For use with a time division switching system capable of operating with various numbers of time slots, said system having port circuits including a ring counter having a number of stages equal to the largest number of time slots with which said system is capable of operating and circuitry for writing connection information into selected ones of said stages, and
means for engaging any one of said circuits on a telecommunications connection, the improvement comprising,
means for receiving information from said engaging means designating a particular time slot for said connection, and
means for controlling said writing circuitry to write connection information selectively into an individual one and a predetermined plurality of said stages in said engaged one of said circuits to cause connections therefrom in said designated time slot, said predetermined plurality being equal to the number of counter stages divided by the number of time slots in said system.

2. The improvement according to claim 1 wherein said means for controlling said writing circuitry further comprises
- a control circuit for controlling said writing circuitry, and
- a cycle counter responsive to control signals from said engaging means for advancing once each time said information is written into said ring counter stages and including means for disabling said control circuit upon reaching a count equal to said predetermined plurality.

3. The improvement according to claim 2 wherein said control circuit further comprises
- a time slot counter for producing a count for each time slot in said switching system,
- a time slot match circuit for determining a match between said count produced by said time slot counter and said received time slot information, and
- a command decoder for controlling said writing circuitry to write said connection information into said ring counter stages each time a match is determined by said time slot match circuit.

4. Network control apparatus for use with a family of time division switching systems each having a different preselected number of time slots, a central processor, and port circuits including a ring counter for controlling connection of said port circuits on a telecommunications connection, said ring counter having a number of stages equal to a largest preselected number of time slots in said family of switching system, said apparatus comprising:
- a time slot counter for producing sequentially a set of counter codes, each of which identifies an individual one of said preselected number of time slots,
- a command circuit operable to produce commands causing bit data to be written into the stages of said ring counter,
- a time slot match circuit responsive to a receipt of time slot information from said processor for comparing said received information with said counter codes, said match circuit operating said command circuit each time a match occurs between said received information and said counter codes, and
- a cycle counter, advanceable each time a match is detected by said match circuit for disabling said command circuit when said cycle counter has been advanced a prescribed number of times.

5. Apparatus according to claim 4 wherein said cycle counter further includes means for presetting said prescribed number of times said counter is advanced equal to said number of ring counter stages divided by the total number of said counter codes.

6. For use with a time division switching system that is capable of operating with various numbers of time slots, which number of time slots is optionally preselected to accommodate different number of ports, said switching system having
- a plurality of port circuits, each of said port circuits having a recirculating ring counter with a number of stages equal to the largest number of time slots with which said system is capable of operating,
- means for selecting two of said port circuits pursuant to forming a communications connection therebetween,
- means for designating a particular time slot during which said connection is to be formed, and
- means controllable to write information into said ring counter stages in said selected port circuits to cause connection of said selected port circuits during said designated time slot, the improvement comprising
- a counter for producing a count each time information is written into one of said ring counter stages in said selected circuits, and
- means responsive to said count for controlling said writing means, said control means disabling said writing means when said count equals the number of said ring counter stages divided by the preselected number of time slots.

7. The improvement according to claim 6 wherein said control means further comprises means operable to enable said writing means, means for operating said enable means at the beginning of one of said time slots, and means for inhibiting said enable means when said count equals the number of said ring counter stages divided by the preselected number of said time slots.

8. The improvement according to claim 6 wherein each of said ring counter stages is associated with one of said time slots and said writing means includes means for detecting a ring counter stage corresponding to said designated time slot and said counter further comprises means controlled by said detecting means for advancing said counter each time said ring counter stage corresponding to said designated time slot is detected.

9. Network control apparatus for use with a time division switching system capable of operating with various numbers of time slots, which number of time slots is optionally preselected to accommodate different numbers of ports, said switching system having
- a system clock,
- a plurality of port circuits each including a recirculatory ring counter driven by said clock for controlling connection of said port circuits on a telecommunications connection, said ring counter having a number of stages equal to the largest number of time slots with which said switching system is capable of operating and circuitry for writing connection information into said stages,
- a processor for selecting two of said plurality of port circuits pursuant to forming a communications connection therebetween, said apparatus comprising,
- means for receiving information from said processor designating a particular time slot for said connection,
- a time slot counter driven by said clock in synchronism with said ring counters for producing a count for each of said preselected number of time slots,
- a match circuit responsive to said received information and said counts for determining a match therebetween,
- a command circuit operable to generate signals for controlling said writing circuitry to write connection information into said ring counter stages in said selected port circuits to cause a communication connection to be established therebetween,
- means for enabling said command circuit at the beginning of one of said time slots,
- means for operating said enabled command circuit to cause generation of said signals when a match is determined by said match circuit,
- a counter for generating a cycle count, means for incrementing said counter each time said match circuit determines a match, and means responsive to said cycle count for resetting said enabling means when said cycle count reaches a predetermined number.

10. Network control apparatus according to claim 9 wherein said enabling means includes a bistable memory device and means responsive to signals generated by said system clock for setting said memory device to one state for enabling said command circuit at the beginning of one of said time slots.

11. Network control apparatus according to claim 10 wherein said means for resetting said enabling means includes a set of gates responsive to said cycle count, one of said gates producing an output for each increment of said counter and means for connecting the one of said gates which produces an output when said cycle count is equal to the number of said ring counter stages divided by the preselected number of said time slots to said bistable memory device to reset said device.

* * * * *

UNITED STATES PATENT AND TRADEMARK OFFICE
CERTIFICATE OF CORRECTION

PATENT NO. : 3,982,076
DATED : September 21, 1976
INVENTOR(S) : Donald G. Hill and Theras G. Lewis It is certified that error appears in the above-identified patent and that said Letters Patent are hereby corrected as shown below:

Column 3, line 36, "F1", second occurrence should read --F1*--. Column 4, line 37, "FIG." should read --FIG. 2--; line 53, "MA13 " should read --MA13*--; line 54, "MA15 " should read --MA15*--; line 58, "MA13 " should read --MA13*--; line 63, "MD00 " should read --MD00*--; line 64, "MD09 " should read --MD09*--; line 67, "MA13 , MA15 " should read --MA13*, MA15*--. Column 5, line 15, "MD00 " should read --MD00*--, "MD09 " should read --MD09*--; line 45, "MA13 " should read --MA13*--; line 46, "MA15 " should read --MA15*--; line 53, "Q" should read --Q--; line 62, "MD07 , MD08 and MD09 " should read --MD07*, MD08* and MD09*--; line 64, "MD07 " should read --MD07*--, "MD09 " should read --MD09*--. Column 6, line 29, "by slot" should read --by time slot--; line 36, "MD00 " should read --MD00*--, "MD05 " should read --MD05*--; line 37, "MD06 " should read --MD06*--; line 39, "MD00 " should read --MD00*--, "MD05 " should read --MD05*--. Column 7, line 28, "F1 " should read --F1*--; line 29, "F1 " should read --F1*--; line 31, "F1 " should read --F1*--. Column 8, line 37, "64" should read --A64--. Column 9, line 14, "CT63 " should read --CT63*--; line 17, "CT63 " should read --CT63*--; line 29, "TC1 " should read --TC1*--, "TC2 " should read --TC2*--; line 34, "CT63 " should read --CT63*--.

Signed and Sealed this

Eighteenth Day of January 1977

[SEAL]

Attest:

RUTH C. MASON
Attesting Officer

C. MARSHALL DANN
Commissioner of Patents and Trademarks